United States Patent [19]
Patel et al.

[11] Patent Number: 5,945,142
[45] Date of Patent: *Aug. 31, 1999

[54] CHEWING GUM HAVING REDUCED SQUEAKINESS DURING CHEWING

[75] Inventors: Mansukh M. Patel, Downers Grove; Michael P. Russell, Oak Lawn, both of Ill.

[73] Assignee: Wm. Wrigley Jr. Company, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,111

[22] Filed: Dec. 23, 1996

[51] Int. Cl.$^6$ .......................................................... A23G 3/30
[52] U.S. Cl. ......................................................... 426/3; 426/4
[58] Field of Search ...................... 426/3, 4, 5, 6

[56] References Cited

U.S. PATENT DOCUMENTS

| | | | |
|---|---|---|---|
| 1,700,387 | 1/1929 | Stetson | 426/3 |
| 2,469,861 | 5/1949 | Cohoe | 426/3 |
| 2,586,675 | 2/1952 | Lutz | 426/3 |
| 3,814,815 | 6/1974 | Hashimoto | 426/3 |
| 5,366,740 | 11/1994 | Shaw | 426/3 |
| 5,424,081 | 6/1995 | Owusu-Ansah et al. | 426/4 |

FOREIGN PATENT DOCUMENTS

| | | |
|---|---|---|
| 0685164 | 12/1995 | European Pat. Off. . |
| 52-96771 | 8/1977 | Japan . |
| 54-044071 | 4/1979 | Japan . |
| 58-94350 | 6/1983 | Japan . |
| 59-55148 | 3/1984 | Japan . |
| 63-7747 | 1/1988 | Japan . |
| 7-163300 | 6/1995 | Japan . |

*Primary Examiner*—Arthur L. Corbin
*Attorney, Agent, or Firm*—Gordon N. McGrew

[57] ABSTRACT

A chewing gum composition which exhibits reduced squeakiness during chewing is disclosed. The chewing gum comprises a gum base which is prone to squeakiness during chewing and a minor amount of gluten which acts to reduce or eliminate the squeakiness.

16 Claims, No Drawings

CHEWING GUM HAVING REDUCED SQUEAKINESS DURING CHEWING

BACKGROUND OF THE INVENTION

The present invention relates generally to chewing gum products. More specifically, the present invention relates to the use of small quantities of gluten which is added to chewing gums or chewing gum bases to reduce the perception of squeakiness or other noises during chewing.

The cause of noise during chewing is not precisely known. However, it is presumed to be due to vibration of the gum cud against teeth or dental work as the cud is chewed. Such noise is frequently noted when certain gum base formulations, particularly non-tack and wax-free formulations, are used. In any event, it is a problem which is seldom, if ever, discussed in the literature.

Gluten is a protein which occurs naturally in grains. It is the component of wheat flour which gives doughs elasticity, a characteristic critical to proper rising. It can also be used as a source of protein for nutritional fortification of foodstuffs.

Gluten use in chewing gums has been disclosed in the patent literature, usually as a potential ingredient for use in non-conventional gum bases. Such products are typically free of the elastomers and resins which make up conventional gum bases. Applicants are unaware of any commercial products which utilize the gluten-based gum bases disclosed in these patents.

EP 0,685,164 to Yajima discloses use of gluten, gliadin or glutenin as an additive for foodstuffs including chewing gum. Examples include "chewing-gum-like" products which use gluten compositions as a substitute for conventional gum bases.

U.S. Pat. No. 2,469,861 to Cohoe discloses digestible gum bases composed of gluten, a prolamine and various other components.

U.S. Pat. No. 1,700,387 to Stetson, U.S. Pat. No. 2,586,675 to Lutz, U.S. Pat. No. 3,814,815 to Hashimoto, U.S. Pat. No. 5,366,740 to Shaw, U.S. Pat. No. 5,424,081 to Yaw, and JP 52-96771 (A) to Tashiro disclose chewing gums and gum bases which are predominantly wheat gluten.

JP 07-163300 (A) Kazuhiko discloses decomposable gums which utilize a mixture of gluten and zein as a gum base.

JP 54-044071 (A) to Nakatsuka discloses use of crosslinked gluten as a gum base.

JP 63-7747 (A) to Maruyama discloses gum bases composed of proteins (including gluten) and tannin.

Two patents propose utilization of gluten as an additive in chewing gums for specific purposes. Applicants are unaware of any commercialization of these patents.

JP 59-55148 (A) to Uchiyama discloses use of gluten as an oil-absorbing agent for chewing gums which contain pulverized cocoa beans.

JP 58-94350 (A) to Fukuda discloses the use of gluten as a carrier for color in chewing gum.

Despite the number of patents describing the use of gluten as an alternative to conventional gum base, the potential benefits of the use of small quantities of gluten as a texture modifier for conventional gum bases have previously been unrecognized.

SUMMARY OF THE INVENTION

The present invention provides a simple, inexpensive method of reducing noise or squeakiness which is perceived by the consumer when chewing certain formulations of chewing gum.

To this end, in an embodiment, a chewing gum comprises a conventional gum base which is prone to noisiness during chewing, a sweetener, a flavor and a minor amount of gluten.

In an embodiment, the gluten is wheat gluten.

In an embodiment, the gluten is premixed with the gum base.

In an embodiment, the wheat gluten is premixed with a fluid chewing gum ingredient.

In an embodiment, the chewing gum is a non-tack chewing gum.

In an embodiment, the chewing gum is free of paraffin wax.

In an embodiment, the gluten is present in a range of about 0.1 to about 8% by weight of the chewing gum, preferably in the range of about 0.25 to about 5%, and most preferably about 0.5 to about 1%.

In an embodiment, a method of reducing noise perceived during chewing of a chewing gum comprises providing a chewing gum base, at least one sweetener, at least one flavor and an amount of gluten sufficient to reduce noise during chewing, and mixing the ingredients together to form a finished chewing gum composition.

In an embodiment, the gum base is prone to noisiness during chewing.

It is an advantage of the current invention to reduce the noisiness of a chewing gum during chewing.

Another advantage of the current invention to reduce the noisiness of a chewing gum formulation by simple addition of an inexpensive ingredient without a major reformulation of the product.

Another advantage of the current invention is to provide a method of reducing noise during the chewing of a chewing gum.

Additional advantages and features of the present invention are described in the detailed description of the presently preferred embodiments.

DETAILED DESCRIPTION OF THE PRESENTLY PREFERRED EMBODIMENTS

The present invention provides improved chewing gum products. Generally, the present invention comprises the use of gluten as an additive to reduce or eliminate noise or squeakiness in chewing gum formulations which are prone to this problem.

The present invention allows for the use of conventional gum bases and other ingredients which are optimized for such properties as texture, flavor, reduced tackiness to teeth and dental appliances and conformity to food laws of various countries. This eliminates the need for expensive and time consuming reformulations which may negatively impact other desired properties while attempting to remedy the noise or squeak problem. The gluten, when used in quantities effective for this purpose, has been found to not negatively impact the desired sensory properties of the formula to which it is added. In fact, there is some evidence that the inclusion of small quantities of wheat gluten can improve sweetness and flavor perception.

Pursuant to the present invention, gluten is added to a chewing gum formulation which is prone to noisiness during chewing. The gluten may be added to a conventional gum base prior to manufacture of the chewing gum, or it may be added to the chewing gum mixer along with the base, sweetener, flavor and other components. Preferably, it is preblended with at least one fluid chewing gum ingredient to improve dispersion of the gluten into the gum mixture. Most preferably, the gluten will be preblended with at least a portion of the gum base, glycerin, syrup or flavor.

The amount of gluten to be used may vary according to the degree of the problem and the degree of alleviation desired. In general, levels of gluten to be used will range from about 0.1 to about 8% by weight of the finished gum, preferably from about 0.25 to about 5% and most preferably from about 0.5 to about 1.0%. If added to the gum base, levels about four to five times higher (by weight of the gum base) will be used.

The preferred wheat gluten is a vital wheat gluten which is commonly available from companies which supply the baking industry. It is believed that less common glutens, for instance from corn or even non-vital wheat gluten, would also be effective for the intended purpose. A particularly preferred gluten is a low flavor vital wheat gluten sold by ADM/Ogilvie of Quebec Canada under the trademark Prolite®. This gluten is preferred because of its low flavor level which does not interfere with the desired flavor of the chewing gum even when used at relatively high levels.

In general, a chewing gum comprises a water-soluble bulk portion, a water-insoluble chewable gum base portion and typically, water-insoluble flavor ingredients. The water-soluble bulk portion dissipates with a portion of the flavor over time during chewing. The gum base portion is retained in the mouth throughout the chew.

The insoluble gum base conventionally comprises elastomers, resins, fats and oils, waxes, softeners and inorganic fillers. In the present invention, the gum base will be one which has been previously identified as having a problem with noise during chewing. The insoluble gum base constitutes between about 5% to about 95% of the gum, and more preferably about 20% to 30%. All percent values represent weight percent.

The gum base typically also includes a filler component. The filler component may be calcium carbonate, magnesium carbonate, talc, dicalcium phosphate, and the like. The filler may constitute between about 5% to about 60% of the gum base. Preferably, the filler comprises about 5% to about 50% of the gum base. The gum base also contains softeners, including glycerol monostearate and glycerol triacetate. Further, gum bases may also contain additional ingredients such as antioxidants, colors, and emulsifiers. The present invention contemplates using any commercially acceptable, conventional gum base.

The water-soluble portion of chewing gum may further comprise softeners, sweeteners, and flavors and combinations thereof The softeners are added to the chewing gum to optimize the chewing ability and mouth feel of the gum. Softeners, also known in the art as plasticizers, generally constitute about 0.1% to about 15% of the chewing gum. Softeners contemplated by the present invention include glycerin, lecithin and combinations thereof. Aqueous sweetener solutions such as those containing sorbitol, hydrogenated starch hydrolysates, corn syrup, and combinations thereof may be used as softeners and binding agents in gum.

Sweeteners contemplated by the present invention for use in chewing gum include both sugar and sugarless components. Sugar sweeteners generally include saccharide-containing components commonly known in the art and include, but are not limited to, sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol, hydrogenated isomaltulose and the like, alone or in any combination. Also contemplated for direct addition to the gum are high intensity sweeteners such as aspartame, sucralose, cyclamate, acesulfame-K, dihydrochalones, glycyrrhizin, alitame, and saccharin, and the food acceptable salts thereof.

Flavors used in the chewing gum are typically essential oils and mixtures of synthetic components and/or essential oils. Commonly used flavors include natural and artificial mint flavors such as peppermint, spearmint and wintergreen; fruit flavors such as orange, lemon, cherry and peach as well as mixed fruits; and spices such as clove and cinnamon. The flavor is typically used at levels between 0.1 and 5% and most commonly between 0.5 and 2% by weight of the finished gum.

Those persons skilled in the art will recognize that any combination of sugar/sugarless sweeteners may be employed in the chewing gum. Further, those skilled in the art will recognize a sweetener may be present in a chewing gum in whole or in part as a water-soluble bulking agent, and that the softener may be combined with a sweetener such as an aqueous sweetener solution.

Sugars and sugar alcohols, when used, will typically be employed at levels between 5 and 90% by weight of the finished gum. Where high intensity sweeteners are used, they will commonly be added at levels between 0.01 by weight and 5% of the finished gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting gum base and adding it to the running mixer. The base may also be melted in the mixer itself Color may also be added at this time. A softener such as glycerin may then be added next along with the syrup and a portion of bulking agent. Further portions of the bulking agents may be added to the mixer.

Preferably, the flavor ingredients are added to the gum mixture near the end of the mixing process. The entire mixing procedure takes from about 5 minutes to 15 minutes, however, longer mixing times may be required. Those persons skilled in the art will recognize that many variations of the above described procedure may be followed.

EXAMPLES

The following examples will serve to illustrate the practice and benefits of the invention.

Example 1

Gum Base

A conventional chewing gum base which was known to be prone to squeakiness during chewing was formulated as follows:

|  | % by Weight |
|---|---|
| Butyl Rubber | 8.41 |
| Polyisobutylene | 6.94 |
| Polyvinylacetate | 23.37 |

-continued

|  | % by Weight |
| --- | --- |
| Fat | 18.83 |
| Mono- and di- glycerides | 4.54 |
| Lecithin | 2.94 |
| Terpene Resin | 14.55 |
| Calcium Carbonate | 19.90 |
| Cocoa Powder | 0.52 |
|  | 100.00 |

Example 2

Gluten Ingredient

In order to facilitate dispersal of the gluten into the chewing gum composition, a premix of gluten, glycerin and flavor was prepared as follows.

|  | % by Weight |
| --- | --- |
| Flavor | 1.64 |
| Glycerin | 65.58 |
| Prolite Wheat Gluten | 32.78 |
|  | 100.00 |

The glycerin was placed in a Hobart Mixer and the gluten was added slowly while mixing. The flavor was added last. Mixing was continued for a total of about 15 minutes until the mixture formed a gel.

Two chewing gum compositions were prepared according to the following formulations:

|  | Example 3 Comparative | Example 4 Inventive |
| --- | --- | --- |
| Sugar | 61.40 | 60.34 |
| Gum Base of Example 1 | 20.00 | 20.00 |
| Dextrose Monohydrate | 7.00 | 7.00 |
| Corn Syrup | 7.00 | 7.00 |
| Glycerin | 1.20 | — |
| Encapsulated Aspartame | 0.30 | 0.30 |
| Flavor | 0.90 | 0.86 |
| Calcium Carbonate | 2.00 | 2.00 |
| Triacetin | 0.20 | 0.20 |
| Gluten Ingredient of Example 2 | — | 2.30 |
|  | 100.00 | 100.00 |

The chewing gum of Example 4 contained 0.75% gluten, and 1.06% less sugar and 0.30% more glycerin but was otherwise identical to Example 3.

An in-house panel of six trained panelists used a nine point scale (0 to 8) to evaluate the gums of Examples 3 and 4. The panel had previously proven an ability to rate samples with a standard deviation of less than one point on the scale. The six panelists chewed each sample and rated it after 1, 2, 3, 4 and 5 minutes of chewing. The test was then replicated to ensure statistical soundness. A total of ten ratings for each sample were made. The pooled results were:

| Gum of: | Rating | Standard Deviation |
| --- | --- | --- |
| Example 3 (Comparative) | 4.96 | 1.01 |
| Example 4 (Inventive) | 3.23 | 0.94 |

The reduction in noisiness for Example 4 was significant at the 95% confidence level thus proving the effectiveness of gluten in reducing noise during chewing.

Based on a series of sensory evaluations, it was concluded that the gums of Examples 3 and 4 were comparable in some sensory attributes. The gum of Example 4 (with gluten) actually had more favorable comments on flavor and sweetness than the prior art gum of Example 3.

We claim:

1. A chewing gum having reduced squeakiness during chewing comprising a gum base which is squeaky during chewing thereof, a sweetener, a flavor and gluten in an amount sufficient to reduce squeakiness in said gum base during chewing therof.

2. The chewing gum of claim 1 wherein the gluten is wheat gluten.

3. The chewing gum of claim 1 wherein the gluten is premixed with the gum base before addition of the flavor and the sweetener.

4. The chewing gum of claim 1 wherein the gluten is premixed with at least one fluid chewing gum ingredient.

5. The chewing gum of claim 1 wherein the gum base is a non-tack gum base.

6. The chewing gum of claim 1 wherein the chewing gum is free of paraffin wax.

7. The chewing gum of claim 1 wherein the chewing gum comprises from about 0.1% to about 8% gluten by weight of the chewing gum.

8. The chewing gum of claim 1 wherein the chewing gum comprises from about 0.25% to about 5% gluten by weight of the chewing gum.

9. The chewing gum of claim 1 wherein the chewing gum comprises from about 0.5% to about 1% gluten by weight of the chewing gum.

10. A method of providing a chewing gum having reduced squeakiness during chewing as compared to a gluten-free chewing gum comprising the steps of:

a. providing a chewing gum base which is squeaky during chewing thereof, b. providing at least one sweetener and at least one flavoring agent, c. providing a sufficient amount of gluten to reduce squeakiness during chewing, and d. mixing the gum base, the sweetener, the flavoring agent and the gluten together to form a finished chewing gum composition.

11. The method of claim 10 wherein the gluten comprises from about 0.1% to about 8% of the finished chewing gum composition.

12. The method of claim 10 wherein the gluten comprises from about 0.25% to about 5% of the finished chewing gum composition.

13. The method of claim 10 where in the gluten comprises from about 0.5% to about 1% of the finished chewing gum composition.

14. The method of claim 10 wherein the gluten is a vital wheat gluten.

15. A non-tack chewing gum comprising a sweetener, a flavor, a non-tack gum base which is squeaky during chewing thereof, and from about 0.1% to about 8% gluten.

16. A wax-free chewing gum comprising a sweetener, a flavor, a wax-free gum base which is squeaky during chewing thereof, and from about 0.1% to about 8% gluten.

* * * * *